US012550303B2

United States Patent
Fan et al.

(10) Patent No.: US 12,550,303 B2
(45) Date of Patent: Feb. 10, 2026

(54) DISPLAY DEVICE

(71) Applicant: AUO Display Plus Corporation, Hsinchu (TW)

(72) Inventors: Kuo Hsuan Fan, Hsinchu (TW); Nan-Ching Lee, Hsinchu (TW); Fa wei Lan, Hsinchu (TW)

(73) Assignee: AUO Display Plus Corporation, Hsinchu (TW)

( * ) Notice: Subject to any disclaimer, the term of this patent is extended or adjusted under 35 U.S.C. 154(b) by 257 days.

(21) Appl. No.: 18/544,479

(22) Filed: Dec. 19, 2023

(65) Prior Publication Data

US 2024/0121927 A1   Apr. 11, 2024

(30) Foreign Application Priority Data

Sep. 14, 2023  (TW) .................................. 112135160

(51) Int. Cl.
*H05K 7/20* (2006.01)
*G06F 1/20* (2006.01)

(52) U.S. Cl.
CPC ......... *H05K 7/20972* (2013.01); *G06F 1/203* (2013.01)

(58) Field of Classification Search
CPC ............. H05K 7/20972; H05K 5/0213; H05K 7/20145; H05K 7/20172; H05K 7/20954; H05K 7/20136; H05K 7/20209; H05K 5/0217; H05K 5/069; H05K 7/20; G02F 1/133385; G02F 1/133342; G02F 2201/36; G06F 1/20; G06F 1/1601; G06F 1/206; G06F 2200/1612; G06F 1/203
See application file for complete search history.

(56) References Cited

U.S. PATENT DOCUMENTS

| | | | | |
|---|---|---|---|---|
| 5,869,919 A | * | 2/1999 | Sato ................... | H05K 7/20972 313/496 |
| 7,705,536 B2 | * | 4/2010 | Yanagawa .......... | H05K 7/20972 313/582 |
| 8,248,784 B2 | * | 8/2012 | Nakamichi ........ | H05K 7/20972 361/752 |
| 8,654,302 B2 | * | 2/2014 | Dunn .................... | H05K 7/202 165/104.34 |

(Continued)

FOREIGN PATENT DOCUMENTS

| CN | 102073205 A | 5/2011 |
|---|---|---|
| CN | 103499909 A | 1/2014 |

(Continued)

*Primary Examiner* — Michael A Matey (57) ABSTRACT

A display device includes the following features. A display panel is disposed in a shell and has a display surface and a back surface. The display surface faces a light-passing portion of the shell, and a first heat dissipation space is formed between the display surface and the light-passing portion. An airflow-blocking plate is disposed in the shell, and a second heat dissipation space is formed among the airflow-blocking plate, the shell and the back surface. A third heat dissipation space is formed between the airflow-blocking plate and the shell. The first heat dissipation space, the second heat dissipation space, the third heat dissipation space, an air inlet and an air outlet of the shell are communicated with each other. A heat-generating assembly is disposed in the second heat dissipation space. A first fan is disposed at the air outlet.

21 Claims, 10 Drawing Sheets

(56) References Cited

U.S. PATENT DOCUMENTS

| | | | | |
|---|---|---|---|---|
| 2008/0165496 A1* | 7/2008 | Kang | ................ | G02F 1/133385 361/692 |
| 2010/0271776 A1* | 10/2010 | Shimizu | ................ | G09F 9/3026 361/690 |
| 2012/0020114 A1* | 1/2012 | Miyamoto | ............... | F21V 29/76 362/613 |
| 2012/0121487 A1* | 5/2012 | Jewell-Larsen | ....... | H01L 23/467 422/171 |
| 2012/0255721 A1* | 10/2012 | Kim | ........................ | G09F 19/22 362/97.1 |
| 2015/0009419 A1* | 1/2015 | Hosoki | ............. | G02F 1/133615 362/613 |
| 2015/0009627 A1* | 1/2015 | Dunn | ................ | G02F 1/133382 361/695 |
| 2016/0198589 A1* | 7/2016 | Kang | ................ | H05K 7/20154 361/692 |
| 2016/0242330 A1* | 8/2016 | Dunn | ................ | G02F 1/133308 |
| 2017/0023823 A1* | 1/2017 | Dunn | ................ | H05K 7/20972 |
| 2017/0172016 A1* | 6/2017 | Kang | ................ | H05K 7/20972 |
| 2018/0088368 A1* | 3/2018 | Notoshi | ............... | G02B 6/0085 |
| 2018/0160573 A1* | 6/2018 | Kim | ................ | G02F 1/133308 |
| 2018/0259806 A1* | 9/2018 | Oh | ..................... | G02F 1/1335 |
| 2018/0263142 A1* | 9/2018 | Oh | ............................ | G06F 1/20 |
| 2019/0075689 A1* | 3/2019 | Selvakumar | ......... | G02B 27/017 |
| 2019/0182981 A1* | 6/2019 | Huang | ................ | G02F 1/1336 |
| 2020/0285099 A1* | 9/2020 | Wang | ................ | G02F 1/133385 |
| 2021/0165472 A1* | 6/2021 | Chin | ........................ | G05D 7/06 |
| 2021/0341783 A1* | 11/2021 | Ahn | ................ | G02F 1/133314 |
| 2022/0252927 A1* | 8/2022 | Wang | ................ | G02F 1/133385 |
| 2023/0095355 A1* | 3/2023 | Lee | .................. | G02F 1/133331 349/161 |
| 2024/0094547 A1* | 3/2024 | Dunsmoor | ......... | H05K 7/20209 |
| 2024/0314988 A1* | 9/2024 | Zhou | ................ | H05K 7/20154 |

FOREIGN PATENT DOCUMENTS

| | | |
|---|---|---|
| CN | 112193094 A | 1/2021 |
| CN | 114604117 A | 6/2022 |

* cited by examiner

DISPLAY DEVICE

CROSS-REFERENCE TO RELATED APPLICATIONS

This application claims the benefit of Taiwanese Application No. 112135160, filed on Sep. 14, 2023, which is hereby incorporated by reference for all purposes as if fully set forth herein.

FIELD OF THE INVENTION

The present invention relates to a display device.

BACKGROUND OF THE INVENTION

A display device has been widely applied to daily life. For example, a household display device is equipped with a loudspeaker to provide a better video and audio effect, and the household display device is usually equipped with many ports for a user to expand video and audio equipment. Besides, portable electronic products such as notebook computers, tablet personal computers, and smartphones can be connected to the display device by way of electrical connection or communication connection, and the like. Thus, the user can browse the content on a larger screen. In addition, the display device is further widely applied to outdoor occasions such as gas stations, charging piles, and outdoor electronic advertising boards.

Generally, the display device substantially includes a backlight module and a display panel, wherein the backlight module can generate light to the display panel, and the display panel can convert the light into images. However, a conventional display device still has the problem of poor heat dissipation, so the image quality is poor, and other parts in the display device are easily gotten breakdown due to overheat.

SUMMARY OF THE INVENTION

The present invention provides a display device, which improves the heat dissipation efficiency by virtue of an internal spatial configuration in combination with an air flow channel design.

To achieve a part of or all of the above objectives or other objectives, the display device provided by the present invention includes a shell, a display panel, a first airflow-blocking plate, a heat-generating assembly and a first fan. The shell has a first side wall, a second side wall, a third side wall and a fourth side wall. The first side wall is opposite to the third side wall. The second side wall is opposite to the fourth side wall, and the second side wall and the fourth side wall are connected between the first side wall and the third side wall. The first side wall has an air inlet, and the second side wall has an air outlet. The third side wall has a light-passing portion and an opaque portion connected to the light-passing portion. A display panel is disposed in the shell and has a display surface and a back surface opposite to the display surface. The display surface faces the light-passing portion and is separated from the light-passing portion to form a first heat dissipation space. The first airflow-blocking plate is disposed in the shell. The first airflow-blocking plate is opposite to the second side wall and is located between the first side wall and the back surface, and a second heat dissipation space is formed between the first airflow-blocking plate and the fourth side wall. A third heat dissipation space is formed between the first airflow-blocking plate and the second side wall. The second heat dissipation space is communicated with the air inlet and the first heat dissipation space, and the third heat dissipation space is communicated with the first heat dissipation space and the air outlet. A heat-generating assembly is disposed in the second heat dissipation space. The first fan is disposed at the air outlet and is adapted to pump air in the third heat dissipation space out of the shell.

In an embodiment of the present invention, the display device can further include a second airflow-blocking plate, a third airflow-blocking plate and a fourth airflow-blocking plate disposed in the shell. The second airflow-blocking plate is disposed opposite to the back surface. The third airflow-blocking plate and the fourth airflow-blocking plate are located next to two opposite side surfaces of the display panel and are respectively connected between the second airflow-blocking plate and the third side wall. The third airflow-blocking plate and the third side wall are separated to form a ventilation opening, and the fourth airflow-blocking plate and the third side wall are separated to form a ventilation opening. The two ventilation openings are communicated with the first heat dissipation space and are located on two opposite sides of the first heat dissipation space.

In an embodiment of the present invention, the display device includes a plurality of first fixing elements and a plurality of second fixing elements. The first fixing elements are connected to the third airflow-blocking plate and the third side wall, and the first fixing elements are respectively separated from each other to form the ventilation opening between the third airflow-blocking plate and the third side wall. The second fixing elements are connected to the fourth airflow-blocking plate and the third side wall, and the second fixing elements are respectively separated from each other to form the ventilation opening between the fourth airflow-blocking plate and the third side wall.

In an embodiment of the present invention, a quantity of the first fans is, for example, plural, and the first fans are arranged in a direction. The direction points to a bottom of the display panel from a top of the display panel.

In an embodiment of the present invention, the display device can further include a fifth airflow-blocking plate and a second fan. The fifth airflow-blocking plate is connected between the first airflow-blocking plate and the second side wall. The second fan is disposed on the fifth airflow-blocking plate and is connected to the first heat dissipation space and the third heat dissipation space. The second fan is adapted to extract air in the first heat dissipation space to the third heat dissipation space.

In an embodiment of the present invention, a quantity of the second fans is, for example, plural, and the second fans are arranged in a direction. The direction points to a bottom of the display panel from a top of the display panel.

In an embodiment of the present invention, the first airflow-blocking plate can be close to the second side wall and away from the fourth side wall.

In an embodiment of the present invention, the air inlet is, for example, overlapped on the heat-generating assembly in an air inlet direction pointing from the first side wall to the third side wall.

In an embodiment of the present invention, the heat-generating assembly can include a power output module and a processing module. The power output module and the processing module are respectively electrically connected to the display panel.

In an embodiment of the present invention, the display device can further include, for example, a dimming layer, and the dimming layer is disposed on the light-passing portion.

The display device provided by the present invention forms the first heat dissipation space, the second heat dissipation space and the third heat dissipation space via the shell, the display panel and the first airflow-blocking plate. In detail, the temperature of the display panel can be reduced through an air flow in the first heat dissipation space, and the temperature of the heat-generating assembly can be reduced through an air flow in the second heat dissipation space. On the other hand, the air flows in the first heat dissipation space and the second heat dissipation space can be pumped to the third heat dissipation space by the fans, and then the air flow in the third dissipation space is pumped out of the shell. Therefore, the display device provided by the present invention can effectively reduce the temperatures of the display panel and the heat-generating assembly, so the heat dissipation efficiency can be improved.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
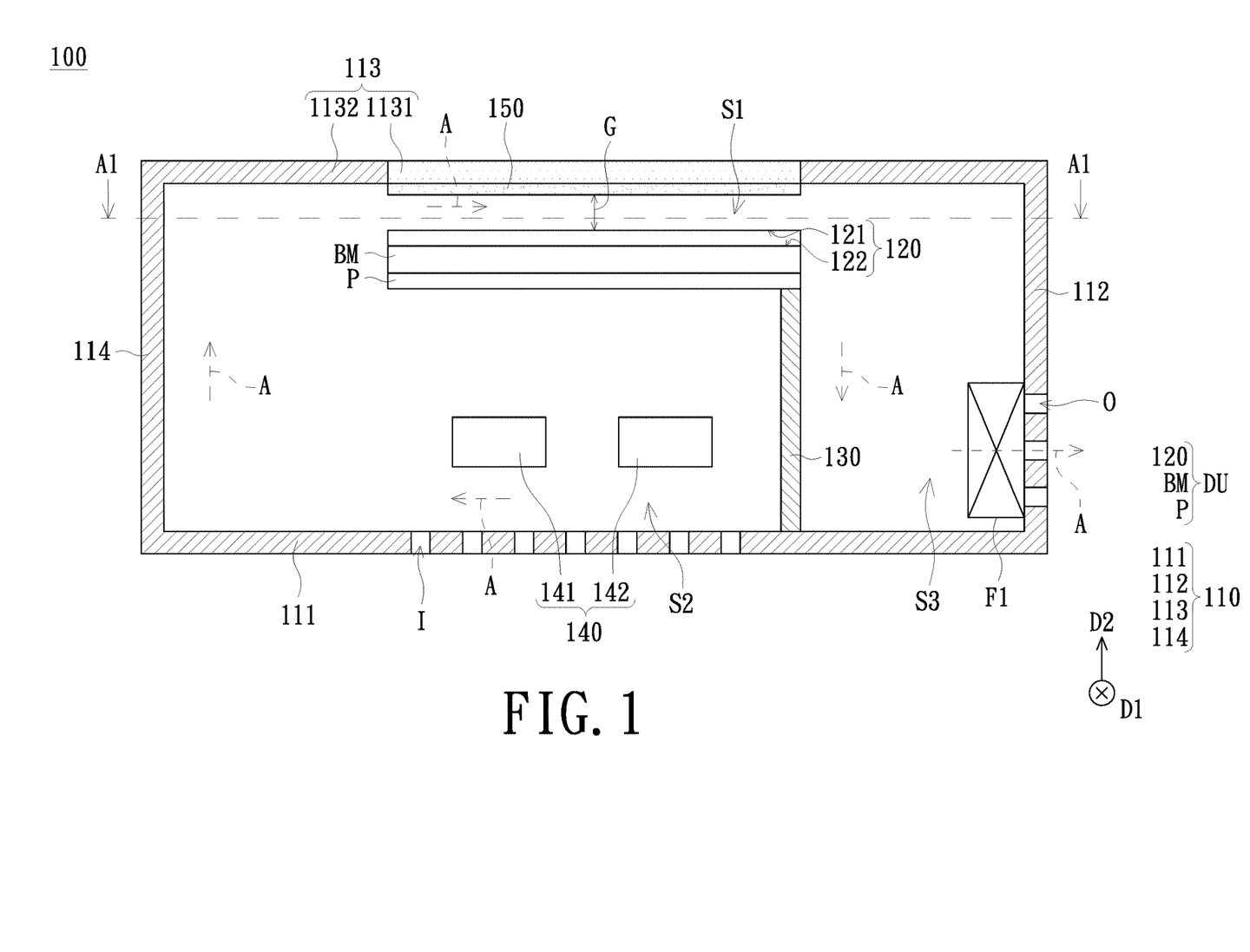
FIG. 1 is a schematic internal top view of a display device in an embodiment of the present invention.

FIG. 1 is a schematic internal top view of a display device in an embodiment of the present invention. Referring to FIG. 1, a display device 100 includes a shell 110, a display panel 120, a first airflow-blocking plate (also called a first spacer plate) 130, a heat-generating assembly 140 and a first fan F1. The shell 110 has a first side wall 111, a second side wall 112, a third side wall 113 and a fourth side wall 114. The first side wall 111 is opposite to the third side wall 113. The second side wall 112 is opposite to the fourth side wall 114, and the second side wall 112 and the fourth side wall 114 are connected between the first side wall 111 and the third side wall 113. The first side wall 111 has an air inlet I, and the second side wall 112 has an air outlet O. The third side wall 113 has a light-passing portion 1131 and an opaque portion 1132 connected to the light-passing portion 1131. The display panel 120 is disposed in the shell 110, and the display panel 120 has a display surface 121 and a back surface 122 opposite to the display surface 121. The display surface 121 faces the light-passing portion 1131, and a channel is formed between the display surface 121 and the light-passing portion 1131. In other words, the display surface 121 and the light-passing portion 1131 are separated to form a first heat dissipation space S1, and the first heat dissipation space S1 is the channel. The first airflow-blocking plate 130 is disposed in the shell 110. The first airflow-blocking plate 130 is opposite to the second side wall 112 and is located between the first side wall 111 and the back surface 122, and a second heat dissipation space S2 is formed between the first airflow-blocking plate 130 and the fourth side wall 114. A third heat dissipation space S3 is formed between the first airflow-blocking plate 130 and the second side wall 112. The second heat dissipation space S2 is communicated with the air inlet I and the first heat dissipation space S1, and the third heat dissipation space S3 is communicated with the first heat dissipation space S1 and the air outlet O. The heat-generating assembly 140 is disposed in the second heat dissipation space S2. The first fan F1 is disposed in the third heat dissipation space S3 and is corresponding to the air outlet O, and the first fan F1 is adapted to pump air in the third heat dissipation space S3 out of the shell 110.

The display device 100 in the embodiment includes, for example, an outdoor display device. In particular, the outdoor display device represents that the display device 100 has to meet a demand on weather-resistant specification of relevant laws and regulations such as waterproofness and heat dissipation. However, in other embodiments, the display device 100 can include an indoor display device.

In the embodiment, the display panel 120 can include a liquid crystal display panel. Specifically, the liquid crystal display panel is easy to liquefy as a temperature of the liquid crystal display panel is too high, and it results in poor image quality. For example, when the display device 100 is placed in an outdoor occasion, long-term solarization easily results in overtemperature of the display panel 120. However, the first heat dissipation space S1 is formed between the third side wall 113 and the display panel 120 of the display device 100 in the embodiment. Thus, the temperature of the display panel 120 can be reduced by an air flow A in the first heat dissipation space S1, thereby improving the heat dissipation efficiency of the display panel 120. Incidentally, in an embodiment, the gap G between the display panel 120 and the third side wall 113 (or the light-passing portion 1131) can be larger than or equal to 1 cm; in detail, the gap G can be determined according to the dimension of the display panel 120, so as to ensure a wind flow passing through the first heat dissipation space S1 is enough to dissipate heat of the display panel 120. For example, in an embodiment, the dimension of the display panel 120 is 49.5 inches, and the gap G may be about 1 cm; in another embodiment, the dimension of the display panel 120 is 55 inches, and the gap G may be about 1.4 cm. However, a specific value of the gap G is not limited by the present invention. Under the conditions that the internal space of the shell 110 is enough and the visual effect of watching the display panel 120 via the light-passing portion 1131 meet specifications, the gap G between the display panel 120 and the third side wall 113 (or the light-passing portion 1131) can be further exceed 3.5 cm or above. Incidentally, the display device 100 in the embodiment may further include a backlight module BM and a back plate P, wherein the BM is disposed opposite to the back surface 122, and the back plate P is fixed to the side of the backlight module BM opposite to the display panel 120. Thus, the display panel 120, the backlight module BM and the back plate P form the display assembly DU. In an embodiment, the display assembly DU can be a self-luminous display assembly, and the display assembly DU at least can be without the backlight module BM. The above-mentioned self-luminous display assembly includes, for example, a light-emitting diode display assembly, an organic light-emitting diode display assembly, a micro light-emitting diode display assembly or a quantum dot display assembly, and the like, which is not limited herein.

In the embodiment, the first airflow-blocking plate 130 is, for example, fixed to the display assembly DU and the first side wall 111, so as to separate the second heat dissipation space S2 and the second heat dissipation space S3, i.e., the second heat dissipation space S2 is not communicated with the second heat dissipation space S3. Specifically, the second heat dissipation space S2 is surrounded by the first airflow-blocking plate 130, the first side wall 111, the fourth side wall 114 and the display panel 120 (or the display assembly DU), and the third heat dissipation space S3 is surrounded by the first airflow-blocking plate 130, the first side wall 111, the second side wall 112 and the third side wall 113. Further, the second heat dissipation space S2 is communicated with the air inlet I, so an air flow out of the shell 110 can be allowed for being flowed into the second heat dissipation space S2; the third heat dissipation space S3 is communicated with the air outlet O, so an air flow inside the shell 110 can be allowed for being flowed out of the shell 110 through the third heat dissipation space S3. In the embodiment, the first airflow-blocking plate 130 can be close to the second side wall 112 and away from the fourth side wall 114. Thus, a volume of the third heat dissipation space S3 is smaller than a volume of the second heat dissipation space S2, so that hot air in the third heat dissipation space S3 is pumped faster by the first fan F1.

Figure 2:
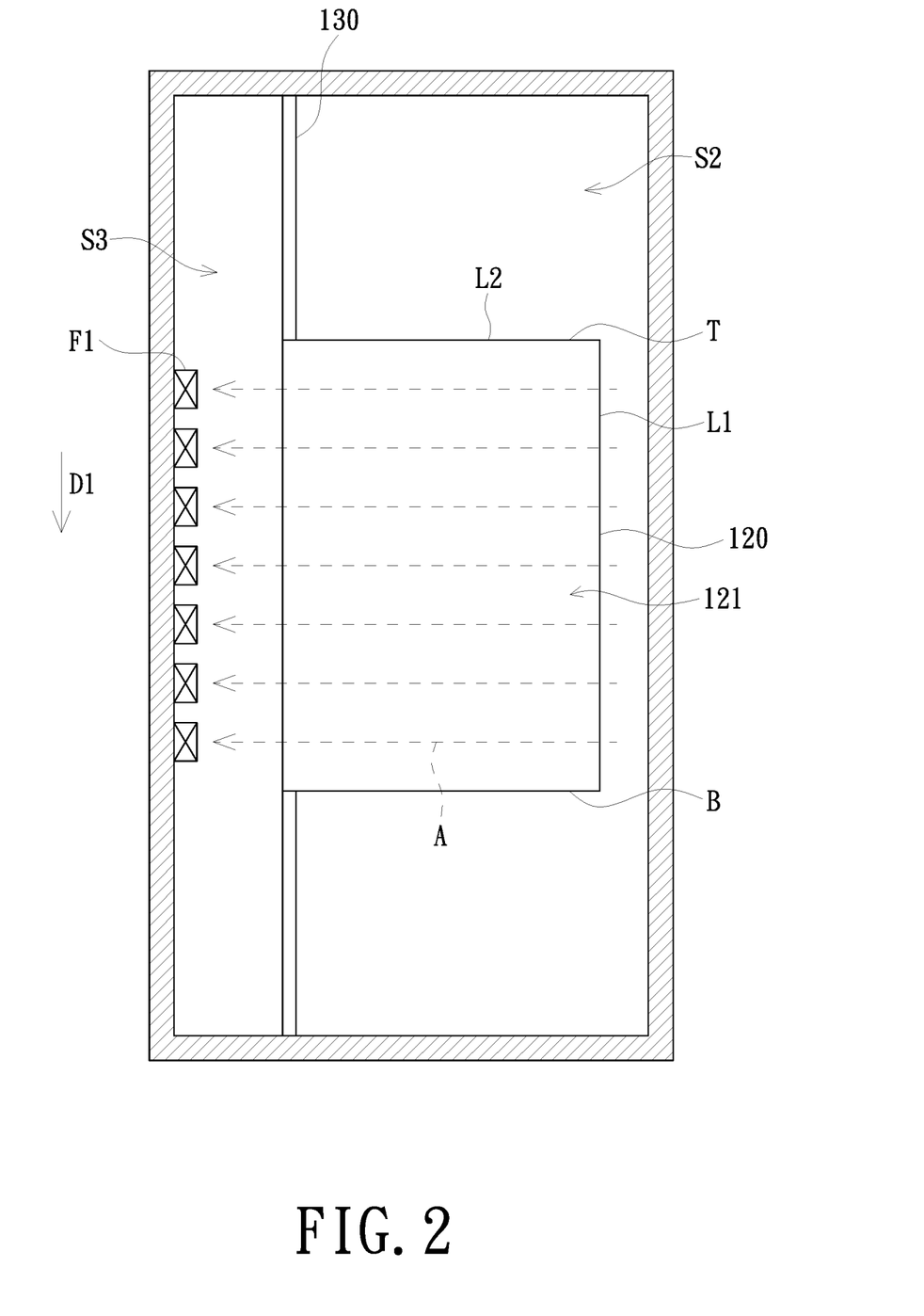
FIG. 2 is a schematic cross-sectional view of the display device, taken along a line A1-A1 in FIG. 1.

FIG. 2 is a schematic cross-sectional view of the display device, taken along the line A1-A1 in FIG. 1. Referring to FIG. 1 and FIG. 2 together, when the first fan F1 is started, the air in the third heat dissipation space S3 is pumped out of the shell 110, thereby generating air flowing. As a result, the air is flowed into the third heat dissipation space from the air inlet I, i.e., the air flow A flowing through the second heat dissipation space S2, the first heat dissipation space S1 and the third heat dissipation space S3 in sequence is generated. In the embodiment, a quantity of the first fan F1 is, for example, plural, and the first fans F1 are arranged in a direction D1. The direction D1 points to a bottom B of the display panel 120 from a top T of the display panel 120. Thus, when the air flow A passes through the first heat dissipation space S1, the air flow A can flow through the whole display surface 121, thereby further improving the heat dissipation efficiency of the display panel 120. Specifically, a shape of the display surface 121 can be in a rectangular manner, and the display surface 121 has a long edge L1 and a short edge L2 connected to the long edge L1, wherein the long edge L1 extends in the direction D1, and the first fans F1 can be arranged along the long edge L1. It is to be noted that there are seven first fans F1 shown in the embodiment, but in other embodiments, the quantity and specification of the first fans F1 can be determined according to the dimension of the display panel 120. For example, in another embodiment, the dimension of the display panel 120 can be between 49.5 inches and 55 inches, and there may be 6-8 first fans F1, and the wind flow of each first fan F1 may be about 190 CFM. However, the quantity and specification of the first fans F1 are not limited by the present invention.

Figure 3:
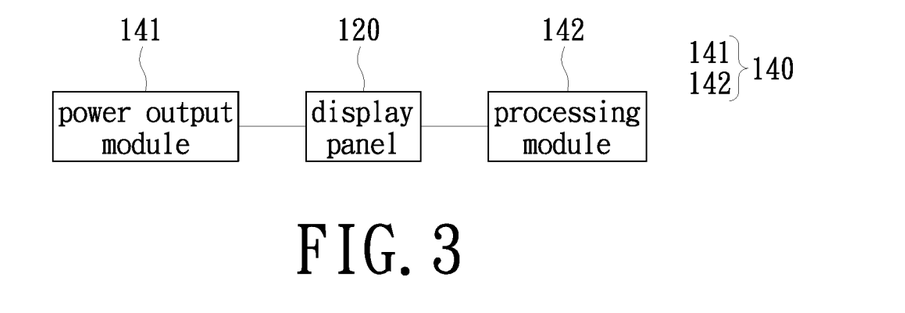
FIG. 3 is a block schematic diagram of a display panel, a power output module and a processing module in FIG. 1.

FIG. 3 is a block schematic diagram of a display panel, a power output module and a processing module in FIG. 1. Referring to FIG. 1 and FIG. 3, the heat-generating assembly 140 is, for example, a part which generates much heat energy when the display device 100 operates. For example, in the embodiment, the heat-generating assembly 140 can include a power output module 141 and a processing module 142. The power output module 141 and the processing module 142 are respectively electrically connected to the display panel 120. In detail, the display device 100 in the embodiment can be applied to a charging pile, so as to allow an external equipment to be charged. On the other hand, the processing module 142 includes, for example, a computing assembly, a storing assembly and a communication assembly, etc., so as to provide functions of transmitting and processing data, and the like. In an embodiment, the computing assembly may include a central processing unit, a microprocessor, and the like, which is not limited herein. It can be understood that, in other embodiments, the heat-generating assembly 140 is not limited to the power output module 141 and the processing module 142.

Figure 4:
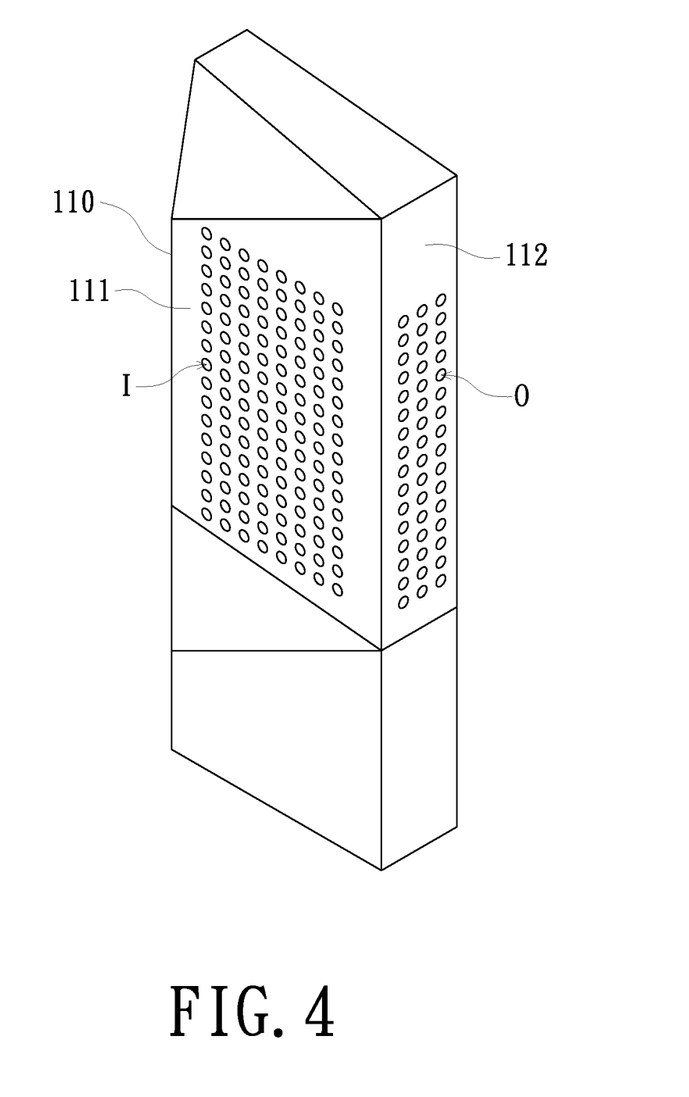
FIG. 4 is a three-dimensional schematic diagram of the display device in FIG. 1.

FIG. 4 is a three-dimensional schematic diagram of the display device in FIG. 1. Referring to FIG. 1 first, in the embodiment, materials of the first side wall 111, the second side wall 112, and the fourth side wall 114 of the shell 110 may include a metal or a plastic. The air inlet I is, for example, overlapped on the heat-generating assembly 140 in an air inlet direction D2 pointed from the first side wall 111 to the third side wall 113. Thus, the flow of air flowing through the heat-generating assembly 140 can be increased, so as to further improve the heat dissipation efficiency of the heat-generating assembly 140. For example, in the embodiment, the air inlet I can be overlapped on the power output module 141 and the processing module 142 in the air inlet direction D2. However, in an embodiment, the air inlet I can be overlapped on the power output module 141 in the air inlet direction D2 and is staggered from the processing module 142. In another embodiment, a fan (not shown in the drawings) can be disposed at the air inlet I, and the fan can pump air out of the shell 110 into the shell 110, thereby further improving the heat dissipation efficiency of the display device 100. Incidentally, referring to FIG. 4, the air inlet I of the first side wall 111 may be in dotted-manner; similarly, the air outlet O of the second side wall 112 may be in dotted-manner, but the shapes of the air inlet I and the air outlet O are not limited by the present invention.

Figure 5:
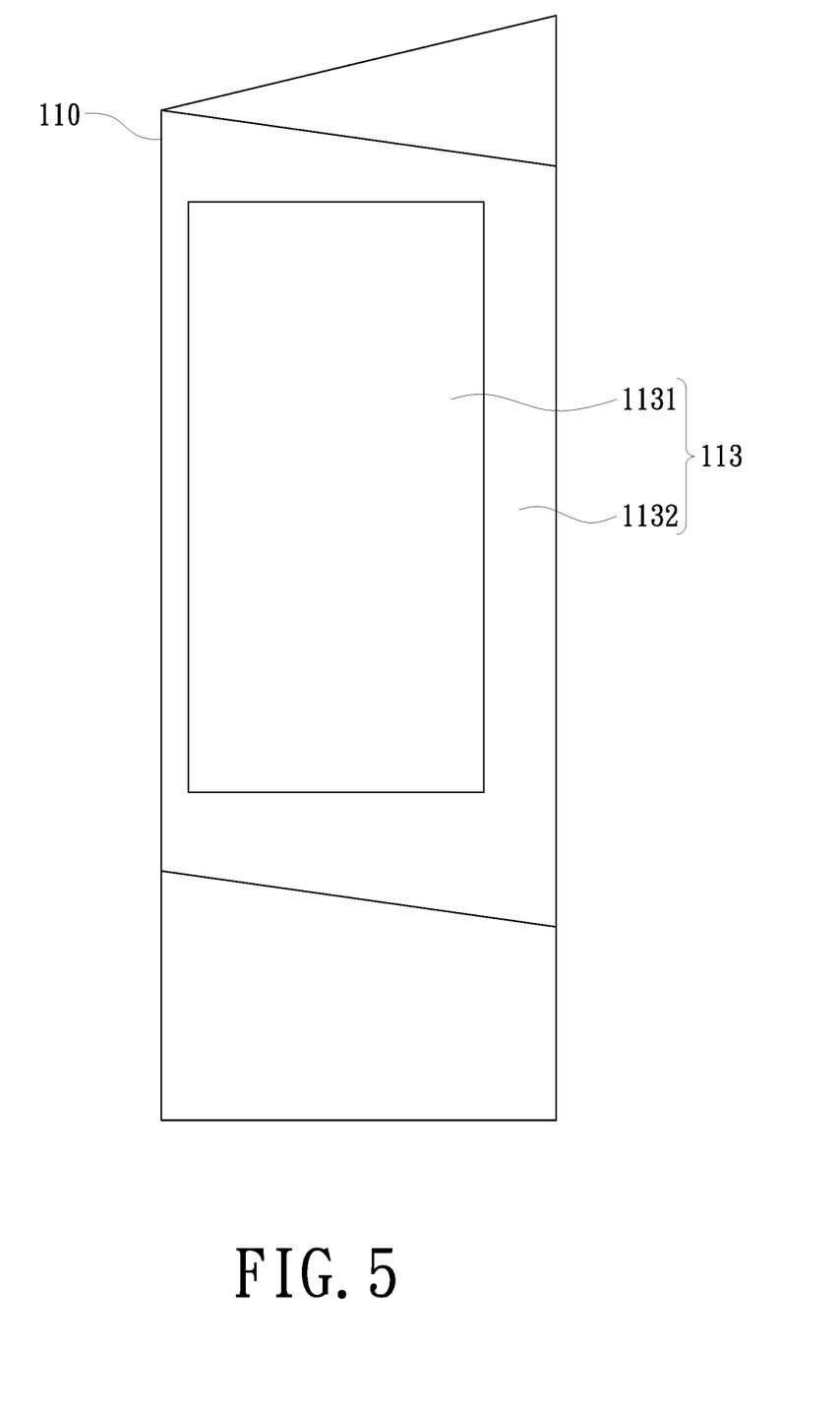
FIG. 5 is a schematic diagram of the display device in FIG. 4 viewed from another viewing angle.

FIG. 5 is a schematic diagram of the display device in FIG. 4 viewed from another viewing angle. Referring to FIG. 1 and FIG. 5, the light-passing portion 1131 is, for example, overlapped on the display panel 120 in the air inlet direction D2, and the light-passing portion 1131 may be surrounded by the opaque portion 1132. In the embodiment, a material of the light-passing portion 1131 of the third side wall 113 may include glass, and a material of the opaque portion 1132 may include a plastic or a metal, which is not limited herein.

Compared with the prior art, the display device 100 in the embodiment forms the first heat dissipation space S1, the second heat dissipation space S2 and the third heat dissipation space S3 via the shell 110, the display panel 120 and the first airflow-blocking plate 130. In detail, the temperature of the display panel 120 can be reduced through an air flow in the first heat dissipation space S1, and the temperature of the heat-generating assembly 140 can be reduced through an air flow in the second heat dissipation space S2. On the other hand, the fans can pump (extract or blow) the air flows in the first heat dissipation space S1 and the second heat dissipation space S2 to the third heat dissipation space S3, and then extracts the air flow in the third dissipation space S3 out of the shell 110. Therefore, the display device 100 in the embodiment can effectively reduce the temperatures of the display panel 120 and the heat-generating assembly 140, thereby improving the heat dissipation efficiency. The fans are, for example, the first fans F1 located at the air outlet O. In other embodiments, the fans may include fans (not shown in the drawings) located at the air inlet I.

For example, for a conventional display device in a sunshine environment with the environment temperature being 50° C., the temperature of about 75% of areas on the display surface exceeds 70° C., and the temperature of at least over 35% of the display surface further exceeds 80° C. Further, when the temperature of the display surface exceeds 80° C., an image is obviously rippled, resulting in obviously poor image quality. However, the display device 100 in an embodiment of the present invention is placed in the sunshine environment with the environment temperature being 50° C., and the temperatures of all areas on the display surface 121 are all lower than 70° C. Therefore, compared with the conventional display device, the display device 100 in an embodiment of the present invention can significantly improve the overheat problem of the display panel 120, thereby improving the image quality.

Reference is continuously made to FIG. 1. Incidentally, the display device 100 in the embodiment further includes, for example, a dimming layer 150, and the dimming layer 150 is disposed on the light-passing portion 1131. Thus, the quantity of rays illuminated to the display panel 120 can be further reduced, thereby further preventing the temperature of the display panel 120 from being too high. The dimming layer 150 is, for example, disposed on the surface of the light-passing portion 1131 facing the display panel 120, but in other embodiments, the dimming layer 150 may be disposed on the surface of the light-passing portion 1131 opposite to the display panel 120. In addition, the dimming layer 150 in the embodiment is, for example, fixed to the light-passing portion 1131 by way of adhesion, but the way fixing the dimming layer 150 is not limited by the present invention.

Figure 6:
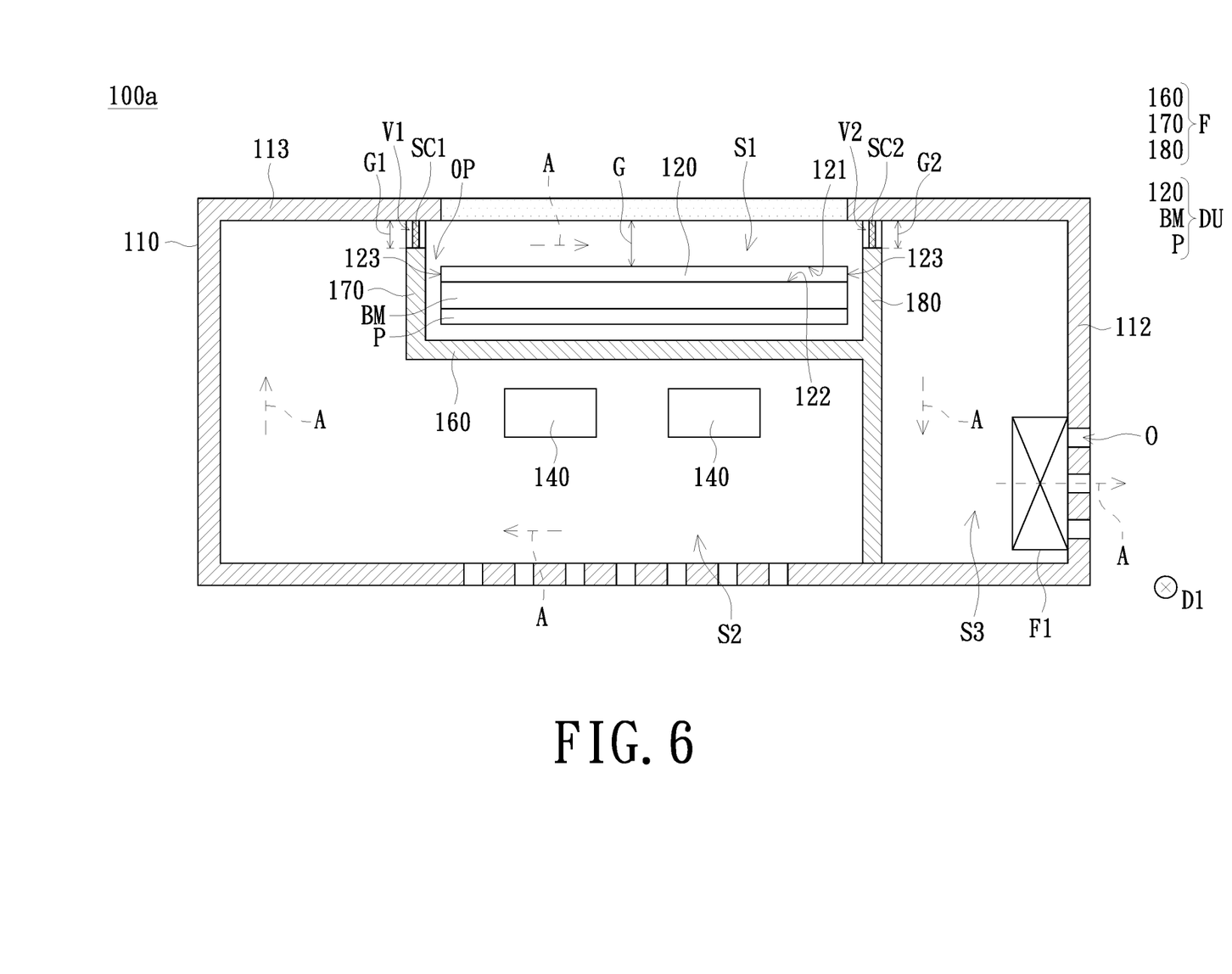
FIG. 6 is an internal top view schematic diagram of a display device in another embodiment of the present invention.
Figure 7:
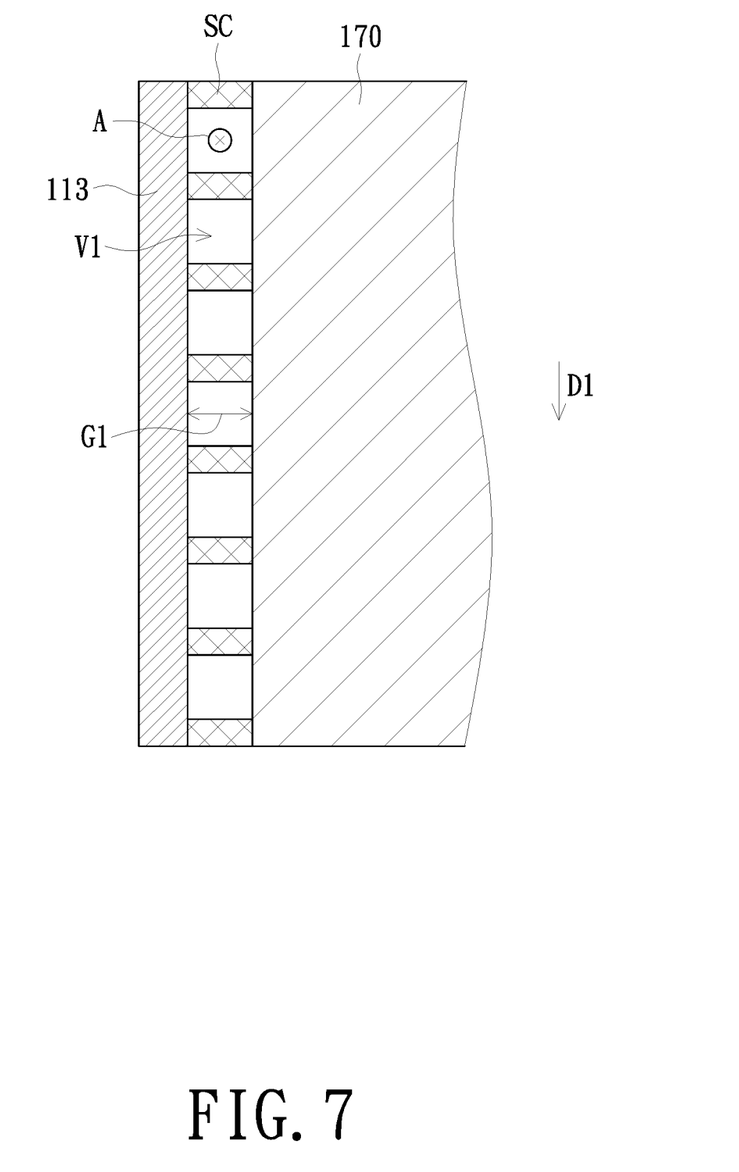
FIG. 7 is a schematic diagram of the first fixing elements being connected to a third airflow-blocking plate and a fourth airflow-blocking plate in FIG. 6.

FIG. 6 is a schematic internal top view of a display device in another embodiment of the present invention. FIG. 7 is a schematic diagram of the first fixing elements being connected to a third airflow-blocking plate and a fourth airflow-blocking plate in FIG. 6. The structure and advantages of the display device 100a in the embodiment are similar to those in the embodiment shown in FIG. 1, wherein the display panel 120, the backlight module BM and the back plate P of the display device 100a form the display assembly DU, and only the differences are described below. Referring to FIG. 6 first, the display device 100a can further include a second airflow-blocking plate 160, a third airflow-blocking plate 170 and a fourth airflow-blocking plate 180 disposed in the shell 110. In detail, the second airflow-blocking plate 160, the third airflow-blocking plate 170 and the fourth airflow-blocking plate 180 can be combined to form a frame F. The display assembly DU is disposed in the frame F, and the frame F has an opening OP to expose the display surface 121. The second airflow-blocking plate 160 is disposed opposite to the back surface 122. The third airflow-blocking plate 170 and the fourth airflow-blocking plate 180 are located next to two opposite side surfaces 123 of the display panel 120, and are respectively connected to the second airflow-blocking plate 160 and the third side wall 113. There is a gap between the third airflow-blocking plate 170 and the third side wall 113. In other words, the third airflow-blocking plate 170 and the third side wall 113 are separated from each other to form the ventilation opening V1, and the ventilation opening V1 is the gap. There is a gap between the fourth airflow-blocking plate 180 and the third side wall 113; that is, the fourth airflow-blocking plate 180 and the third side wall 113 are separated from each other to form the ventilation opening V2, and the ventilation opening V2 is the gap. The ventilation openings V1 and V2 are communicated with the first heat dissipation space S1, and are located on two opposite sides of the first heat dissipation space S1. Particularly, the second airflow-blocking plate 160 and the third airflow-blocking plate 170 can further separate the first heat dissipation space S1 and the second heat dissipation space S2, and the fourth airflow-blocking plate 180 can further separate the first heat dissipation space S1 and the third heat dissipation space S3. Thus, the air flow A can more concentratedly pass through the first heat dissipation space S1, and the air pumping efficiency of the first fans F1 on the third heat dissipation space S3 can be further improved, thereby improving the heat dissipation efficiency of the display device 100a.

More specifically, the ventilation opening V2 of the fourth airflow-blocking plate 180 can be communicated with the third heat dissipation space S3, and therefore, the air flow A can enter the first heat dissipation space S1 from the second heat dissipation space S2 through the ventilation opening V1, and enter the third heat dissipation space S3 from the first heat dissipation space S1 through the ventilation opening V2, and then leaves the shell 110 through the air outlet O. Referring to FIG. 6 and FIG. 7 together, the display device 100a can further include a plurality of first fixing elements SC1 and a plurality of fixing elements SC2, wherein the first fixing elements SC1 and the second fixing elements SC2 can collectively refer to fixing elements. The first fixing elements SC1 are connected to the frame F and the third side wall 113. Specifically, the first fixing elements SC1 are connected to the third airflow-blocking plate 170 and the third side wall 113 of the frame F, and the first fixing elements SC1 are separated from each other to form the ventilation opening V1. The second fixing elements SC2 are connected to the frame F and the third side wall 113. Specifically, the second fixing elements SC2 are connected to the fourth airflow-blocking plate 180 and the third side wall 113 of the frame F. The second fixing elements SC2 are separated from each other to form the ventilation opening V2. In the embodiment, the first fixing elements SC1 and the second fixing elements SC2 may include screws. In detail, the first fixing elements SC1 can be screwed between the third airflow-blocking plate 170 and the third side wall 113, and are separated from each other in the direction D1 to form the ventilation opening V1. On the other hand, the way to arrange the second fixing elements SC2 is the same as that for the first fixing elements SC1 in FIG. 7. The second fixing elements SC2 can be screwed between the fourth airflow-blocking plate 180 and the third side wall 113, and are separated from each other in the direction D1 to form the ventilation opening V2. Therefore, the air flow A will be interfered by the screws SC to form a turbulent flow when passing through the ventilation openings V1 and V2, thereby further improving the heat dissipation efficiency of the display panel 120 made by the air flow A. Incidentally, referring to FIG. 6 continuously, the heat-generating assembly 140 and the first airflow-blocking plate 130 are, for example, fixed to the second airflow-blocking plate 160, but which is not limited herein. In the embodiment, an inner diameter (i.e., the gap G) of the channel (i.e., the first heat dissipation space S1) can be respectively larger than the inner diameters G1 and G2 of the two gaps. Therefore, the flow rate of the air flow A is changed as passing through the gaps, thereby disturbing the flow direction of the air flow A to form a turbulent flow, so as to further improve the heat dissipation efficiency of the display panel 120 made by the air flow A.

Figure 8:
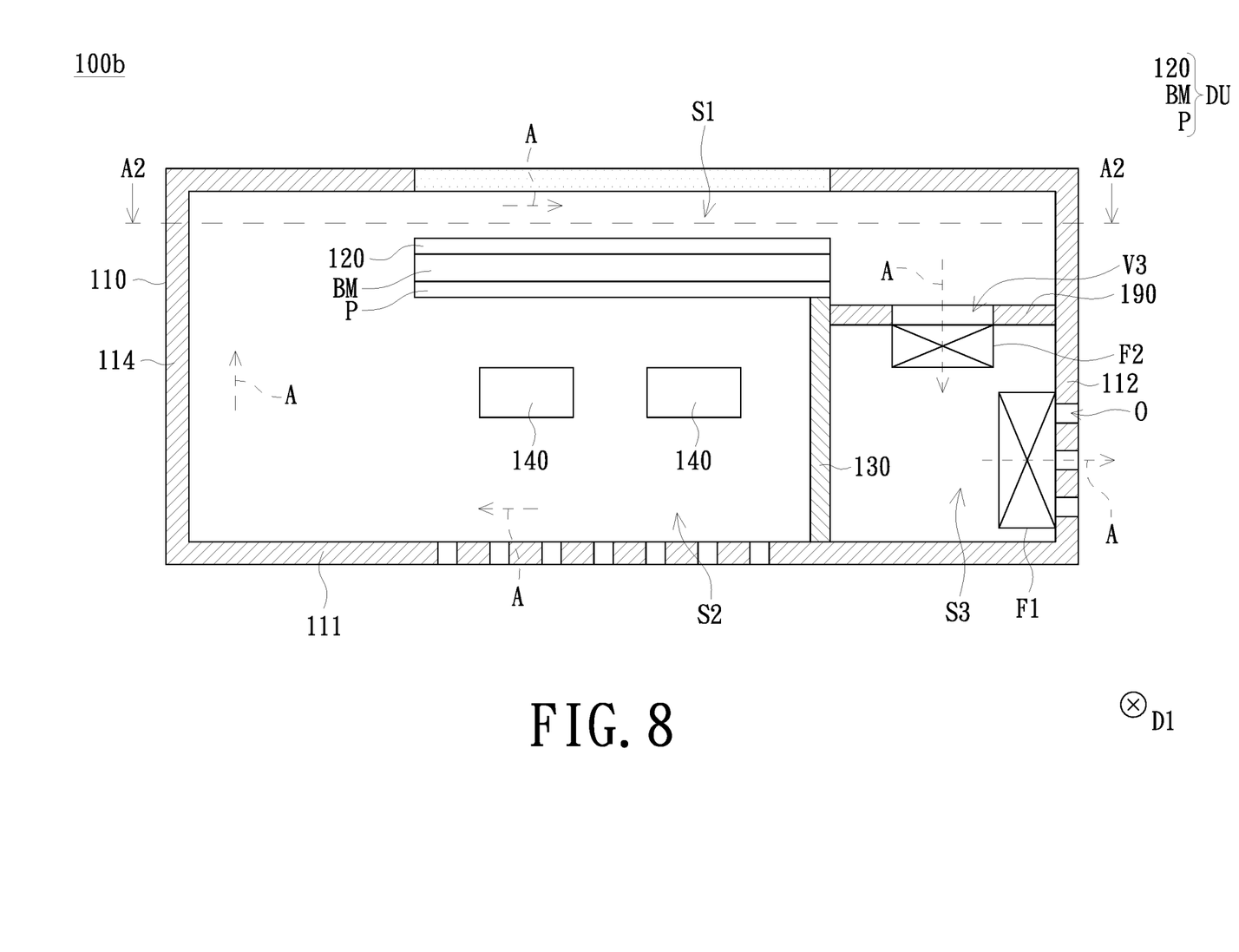
FIG. 8 is an internal top view schematic diagram of the display device in another embodiment of the present invention.
Figure 9:
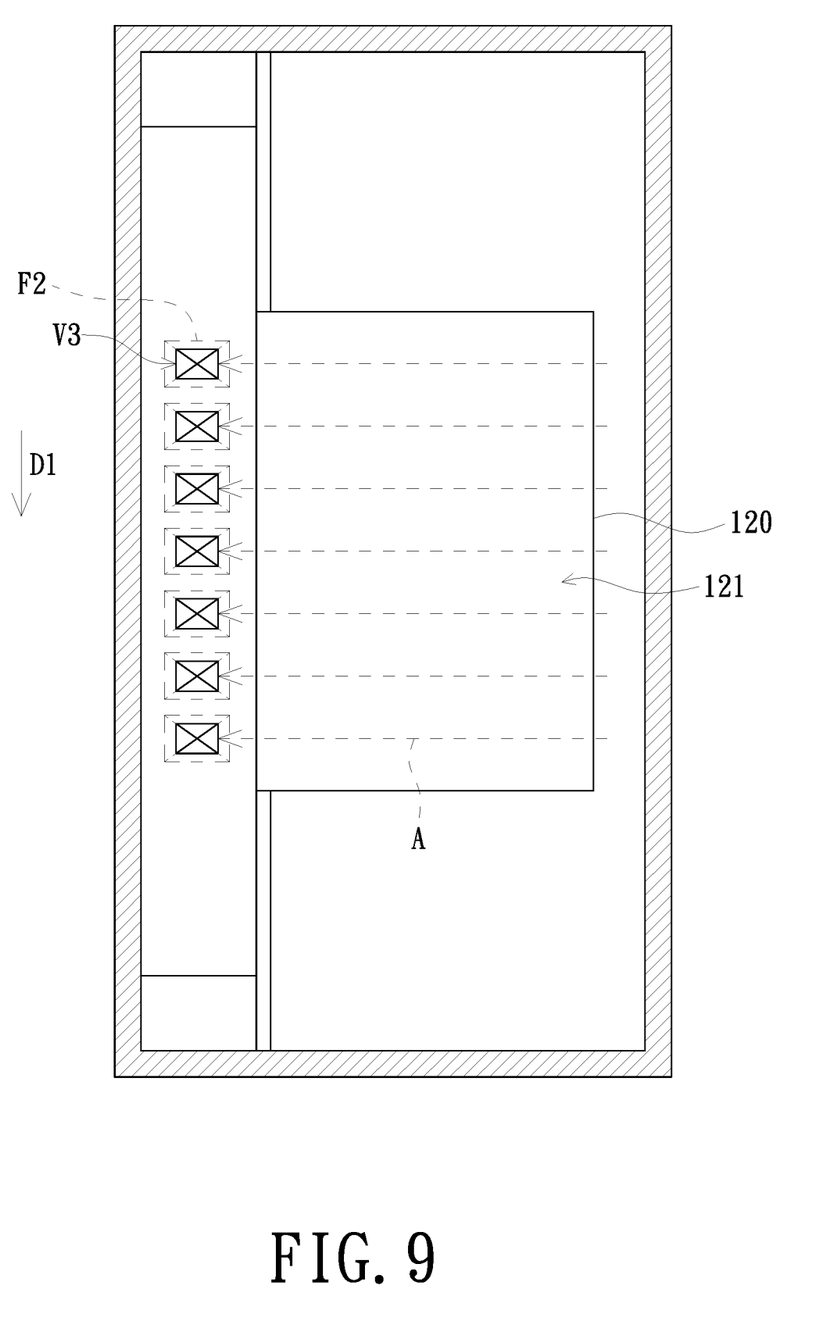
FIG. 9 is a schematic cross-sectional view of the display device, taken along a line A2-A2 in FIG. 8.

FIG. 8 is a schematic internal top view of the display device in another embodiment of the present invention. FIG. 9 is a schematic cross-sectional view of the display device, taken along a line A2-A2 in FIG. 8. The structure and advantages of the display device 100b in the embodiment are similar to those in the embodiment shown in FIG. 1, wherein the display panel 120, the backlight module BM and the back plate P of the display device 100b form the display assembly DU, and only the differences are described below. Referring to FIG. 8 first, the display device 100b can further include a fifth airflow-blocking plate (also called a second spacer plate) 190 and a second fan F2. The fifth airflow-blocking plate 190 is connected between the first airflow-blocking plate 130 and the second side wall 112. The second fan F2 is disposed on the fifth airflow-blocking plate 190, and is communicated with the first heat dissipation space S1 and the third heat dissipation space S3. The second fan F2 is adapted to pump air in the first heat dissipation space S1 to the third heat dissipation space S3. Thus, the rate of the air flow A flowing through the first heat dissipation space S1, the second heat dissipation space S2 and the third heat dissipation space S3 can be further improved, so that the hot air can be discharged faster out of the shell 110, thereby further improving the heat dissipation efficiency of the display device 100b. In detail, the fifth airflow-blocking plate 190 can have a ventilation opening (also called a set hole) V3 (also drawn in FIG. 9) communicated with the second heat dissipation space S2 and the third heat dissipation space S3, and the second fan F2 can be disposed at the ventilation opening V3. Incidentally, in an embodiment, the first fan F1 and the second fan F2 can be connected via a flow tube (not shown in the drawings), so as to further enhance the rate of the first fan F1 and the second fan F2 to pump the hot air out of the shell 110.

Referring to FIG. 8 and FIG. 9 together, in the embodiment, a quantity of the second fan F2 is, for example, plural, and the second fans F2 are arranged in a direction D1. Thus, when the air flow A generated by the second fans F2 passes through the first heat dissipation space S1, it can make sure the air flow A can flow through the whole display surface 121, thereby further improving the heat dissipation efficiency of the display panel 120. It can be understood that the quantity and specification of the second fans F2 are substantially the same as those of the first fans F1, so related descriptions are omitted herein.

Figure 10:
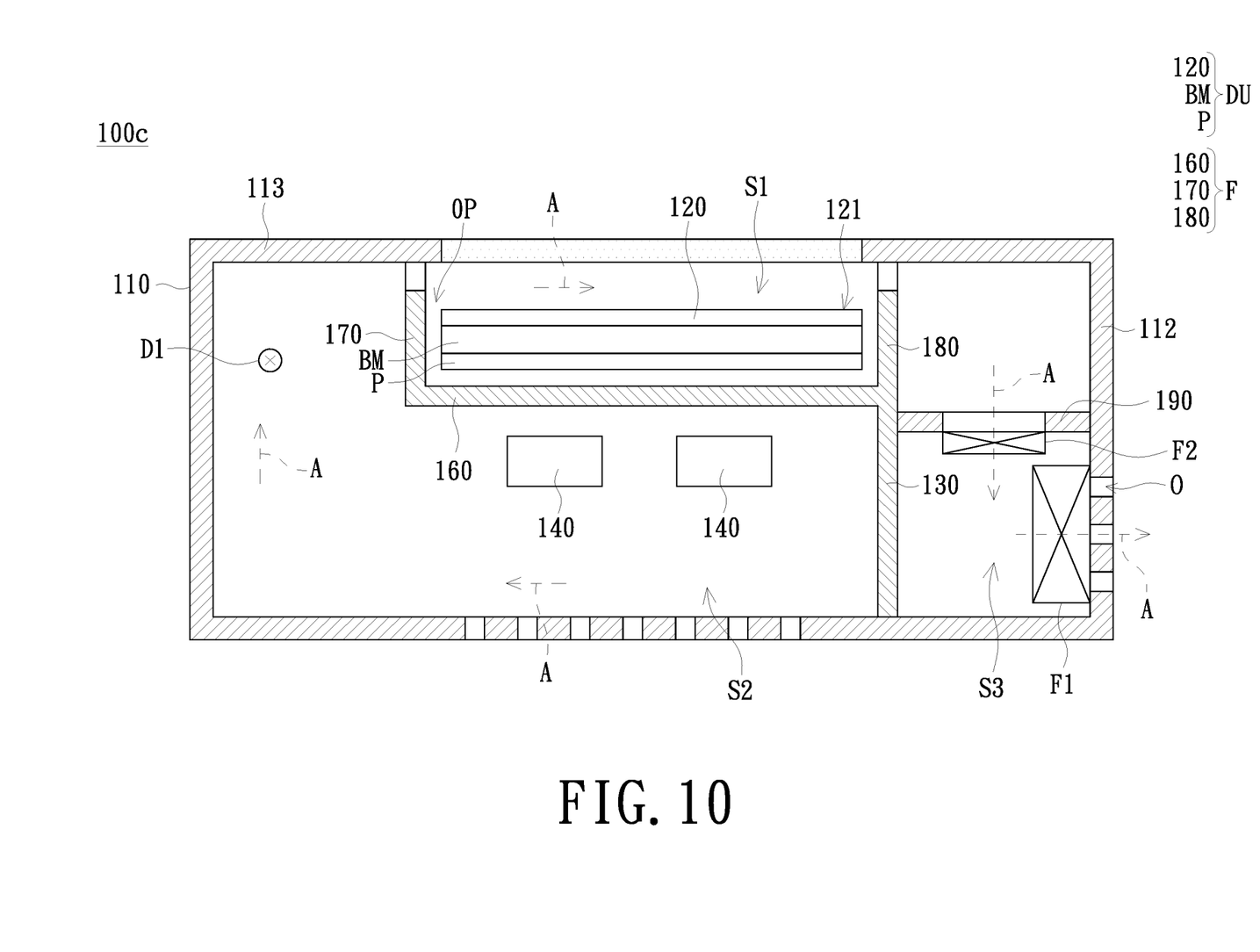
FIG. 10 is an internal top view schematic diagram of the display device in another embodiment of the present invention.

FIG. 10 is a schematic internal top view of the display device in another embodiment of the present invention. The structure and advantages of the display device 100c in the embodiment are similar to those in the embodiment shown in FIG. 1, wherein the display panel 120, the backlight module BM and the back plate P of the display device 100c form the display assembly DU, and only the differences are described below. Referring to FIG. 10, it can be understood that the fifth airflow-blocking plate 190 can be configured in the display device 100a in FIG. 6. Further, the first airflow-blocking plate 130 is connected to the frame F. More specifically, the first airflow-blocking plate 130 is connected to the second airflow-blocking plate 160 of the frame F. In addition, the fifth airflow-blocking plate 190 is connected between the first airflow-blocking plate 130 and the second side wall 112 of the frame F. In an embodiment, the fifth airflow-blocking plate 190 may be connected between the frame F and the second side wall 112. Further, the fifth airflow-blocking plate 190 can be connected between the fourth airflow-blocking plate 180 and the second side wall 112 of the frame F.

Figure 11:
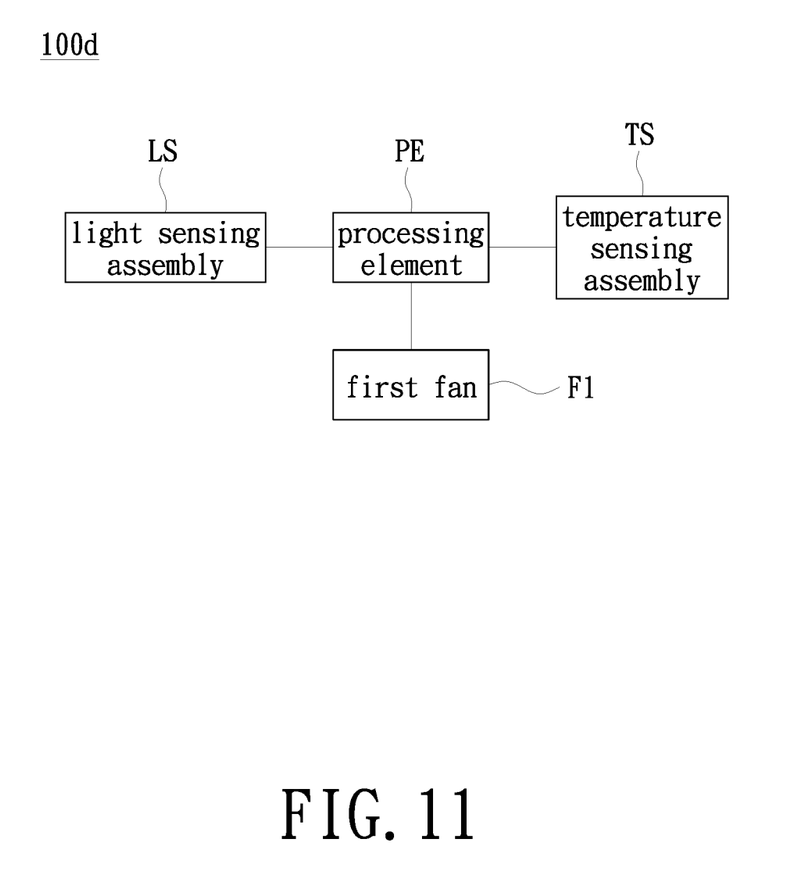
FIG. 11 is a block schematic diagram of a first fan, a processing assembly, a light sensing assembly and a temperature induction assembly of the display device in another embodiment of the present invention.

FIG. 11 is a block schematic diagram of a first fan, a processing assembly, a light sensing assembly and a temperature induction assembly of the display device in another embodiment of the present invention. The structure and advantages of the display device 100d in the embodiment are similar to those in the embodiment shown in FIG. 1, and only the differences are described below. Referring to FIG. 11, the display device 100d may further include a processing element PE and a temperature sensing assembly TS. The TS is disposed in the shell 110 (drawn in FIG. 1). The processing element PE is electrically connected to the temperature sensing assembly TS and the first fans F1. The temperature sensing assembly TS is adapted to generate a temperature value, and the processing element PE is adapted to control the rotating speed of the first fans F1 according to the temperature value, so that the display device 100d can be more power-saving. In detail, the processing element PE can improve or reduce the rotating speed of the first fans F1 according to the temperature value, or stop or start the first fans F1 according to the temperature value. It can be understood that, in an embodiment, the processing element PE and the temperature sensing assembly TS can be configured in the display device 100b in FIG. 8 or the display device 100c in FIG. 10, and the processing element PE can further control the rotating speed of the second fans F2 according to the temperature value. In the embodiment, the temperature sensing assembly TS can be used for sensing the temperature of the display panel 120. In an embodiment, the temperature sensing assembly TS can be used for sensing the temperature of the heat-generating assembly 140. In addition, the processing element PE in the embodiment can include a central processing unit, a microprocessor, and the like, which is not limited herein.

Besides the temperature sensing assembly TS, the display device 100d in the embodiment may further include a light sensing assembly LS. The light sensing assembly LS is disposed out of the shell 110 and is located next to the light-passing portion. The processing element PE is electrically connected to the light sensing assembly LS and the first fans F1. The light sensing assembly LS is adapted to generate a brightness value, and the processing element PE is adapted to control the rotating speed of the first fans F1 according to the brightness value, so that the display device 100d can be more power-saving. Further, the processing element PE can improve or reduce the rotating speed of the first fans F1 according to the brightness value, or stop or start the first fans F1 according to the brightness value. In an embodiment, the processing element PE and the light sensing assembly LS can be configured in the display device 100b in FIG. 8 or the display device 100c in FIG. 10, and the processing element PE can further control the rotating speed of the second fans F2 according to the brightness value. Incidentally, the display device 100d in the embodiment is configured with both the temperature sensing assembly TS and the light sensing assembly LS. In an embodiment, the display device 100d may be configured with the temperature sensing assembly TS or the light sensing assembly LS. In another embodiment, the display device 100d may be configured with other types of sensing assemblies according to different requirements, which is not limited herein.

In summary, the display device of the present invention forms the first heat dissipation space, the second heat dissipation space and the third heat dissipation space via the shell, the display panel and the first airflow-blocking plate. In detail, the temperature of the display panel can be reduced through an air flow in the first heat dissipation space, and the temperature of the heat-generating assembly can be reduced through an air flow in the second heat dissipation space. On the other hand, the air flows in the first heat dissipation space and the second heat dissipation space can be pumped to the third heat dissipation space by the first fans and/or the second fans, and then the air flow in the third dissipation space is pumped out of the shell. Therefore, the display device provided by the present invention can effectively reduce the temperatures of the display panel and the heat-generating assembly, so the heat dissipation efficiency can be improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device, comprising:
   a shell, having a first side wall, a second side wall, a third side wall and a fourth side wall, the first side wall being opposite to the third side wall, the second side wall being opposite to the fourth side wall, the second side wall and the fourth side wall being connected between the first side wall and the third side wall, the first side wall having an air inlet, the second side wall having an air outlet, and the third side wall having a light-passing portion and an opaque portion connected to the light-passing portion;
   a display panel, disposed in the shell and having a display surface and a back surface opposite to the display surface, and the display surface facing the light-passing portion and being separated from the light-passing portion to form a first heat dissipation space;
   a first airflow-blocking plate, disposed in the shell, the first airflow-blocking plate being opposite to the second side wall, the first airflow-blocking plate being located between the first side wall and the back surface, a second heat dissipation space being formed between the first airflow-blocking plate and the fourth side wall, a third heat dissipation space being formed between the first airflow-blocking plate and the second side wall, the second heat dissipation space being communicated with the air inlet and the first heat dissipation space, and the third heat dissipation space being communicated with the first heat dissipation space and the air outlet;
   a heat-generating assembly, disposed in the second heat dissipation space; and
   a first fan, disposed at the air outlet and adapted to pump air in the third heat dissipation space out of the shell.

2. The display device according to claim 1, further comprising a second airflow-blocking plate, a third airflow-blocking plate and a fourth airflow-blocking plate disposed in the shell, wherein the second airflow-blocking plate is disposed opposite to the back surface, the third airflow-blocking plate and the fourth airflow-blocking plate are located next to two opposite side surfaces of the display panel and are respectively connected between the second airflow-blocking plate and the third side wall, the third airflow-blocking plate and the third side wall are separated to form a ventilation opening, the fourth airflow-blocking plate and the third side wall are respectively separated to form a ventilation opening, and the two ventilation openings are communicated with the first heat dissipation space and are located on two opposite sides of the first heat dissipation space.

3. The display device according to claim 2, further comprising a plurality of first fixing elements and a plurality of second fixing elements, wherein the plurality of first fixing elements are connected to the third airflow-blocking plate and the third side wall, and the first fixing elements are separated from each other to form the ventilation opening between the third airflow-blocking plate and the third side wall, the plurality of second fixing elements are connected to the fourth airflow-blocking plate and the third side wall, and the second fixing elements are separated from each other to form the ventilation opening between the fourth airflow-blocking plate and the third side wall.

4. The display device according to claim 1, wherein a quantity of the first fans is plural, the first fans are arranged in a direction, and the direction points to a bottom of the display panel from a top of the display panel.

5. The display device according to claim 1, further comprising a fifth airflow-blocking plate and a second fan, wherein the fifth airflow-blocking plate is connected between the first airflow-blocking plate and the second side wall, the second fan is disposed on the fifth airflow-blocking plate and is communicated with the first heat dissipation space and the third heat dissipation space, and the second fan is adapted to pump air in the first heat dissipation space to the third heat dissipation space.

6. The display device according to claim 5, wherein a quantity of the second fans is plural, and the second fans are arranged in a direction, and the direction points to a bottom of the display panel from a top of the display panel.

7. The display device according to claim 1, wherein the first airflow-blocking plate is close to the second side wall and is away from the fourth side wall.

8. The display device according to claim 1, wherein the air inlet is overlapped on the heat-generating assembly in an air inlet direction pointing from the first side wall to the third side wall.

9. The display device according to claim 1, wherein the heat-generating assembly comprises a power output module and a processing module, and the power output module and the processing module are respectively electrically connected to the display panel.

10. The display device according to claim 1, further comprising a dimming layer, wherein the dimming layer is disposed on the light-passing portion.

11. A display device, comprising:
a shell, having a first side wall, a second side wall and a third side wall, the first side wall being adjacent to the second side wall, the third side wall being opposite to the first side wall, the first side wall having an air inlet, the second side wall having an air outlet, and the third side wall having a light-passing portion;
a frame, disposed in the shell, and a gap being between the frame and the third side wall;
a display assembly, disposed in the frame and having a display surface facing the light-passing portion, and a channel being formed between the display surface and the light-passing portion;
a heat-generating assembly, disposed between the frame and the first side wall; and
a first fan, disposed at the air outlet;
wherein the frame comprises:
a first spacer plate, disposed opposite to the second side wall, the first spacer plate being located between the first side wall and the third side wall to separate a second heat dissipation space and a third heat dissipation space located on two sides of the first spacer plate within the shell, the second heat dissipation space being adjoined to the air inlet, the third heat dissipation space being located between the first spacer plate and the second side wall and being adjoined to the air outlet, and the channel being communicated with the second heat dissipation space and the third heat dissipation space.

12. The display device according to claim 11, wherein the display assembly has a display panel, a backlight module and a back plate, wherein the display panel has the display surface, the back plate is adjacent to the frame, and the backlight module is located between the display panel and the back plate.

13. The display device according to claim 11, wherein the frame has an opening to expose the display surface.

14. The display device according to claim 11, wherein a quantity of the first fan is plural, and the first fans are arranged in a direction, and the direction points to a bottom of the display panel from a top of the display panel.

15. The display device according to claim 11, further comprising a second spacer plate and a second fan, wherein the second spacer plate is connected between the first spacer plate and the second side wall or is connected between the first spacer plate and the frame, the second spacer plate has a set hole, and the second fan is disposed at the set hole.

16. The display device according to claim 15, wherein a quantity of the second fan is plural, the second fans are arranged in a direction, and the direction points to a bottom of the display panel from a top of the display panel.

17. The display device according to claim 11, wherein the air inlet is overlapped on the heat-generating assembly in an air inlet direction pointing from the first side wall to the third side wall.

18. The display device according to claim 11, wherein the heat-generating assembly comprises a power output module and a processing module, and the power output module and the processing module are respectively electrically connected to the display panel.

19. The display device according to claim 11, further comprising a dimming layer, wherein the dimming layer is disposed on the light-passing portion.

20. The display device according to claim 11, wherein an inner diameter of the channel is larger than an inner diameter of the gap.

21. The display device according to claim 11, further comprising a plurality of fixing elements, wherein the plurality of fixing elements are connected to the frame and the third side wall, and the fixing elements are separated from each other to form the gap.

* * * * *